US012118632B2

(12) United States Patent
Liu et al.

(10) Patent No.: US 12,118,632 B2
(45) Date of Patent: Oct. 15, 2024

(54) METHOD, DEVICE, AND COMPUTER PROGRAM PRODUCT FOR SCHEDULING TOUR GUIDING RESOURCES

(71) Applicant: EMC IP Holding Company LLC, Hopkinton, MA (US)

(72) Inventors: Yanjun Liu, Shanghai (CN); Chi Chen, Chengdu (CN); Tao Zhang, Suzhou (CN); Zhiqiang Hu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

(21) Appl. No.: 17/529,525

(22) Filed: Nov. 18, 2021

(65) Prior Publication Data

US 2023/0128597 A1 Apr. 27, 2023

(30) Foreign Application Priority Data

Oct. 21, 2021 (CN) .......................... 202111227218.7

(51) Int. Cl.
*G06Q 50/14* (2012.01)
*G06Q 10/0631* (2023.01)
(Continued)

(52) U.S. Cl.
CPC ....... *G06Q 50/14* (2013.01); *G06Q 10/06314* (2013.01); *G06Q 30/0202* (2013.01); *G06Q 30/0205* (2013.01)

(58) Field of Classification Search
CPC ......... G06Q 10/06314; G06Q 30/0202; G06Q 30/0205; G06Q 50/14
See application file for complete search history.

(56) References Cited

U.S. PATENT DOCUMENTS 9,516,470 B1 * 12/2016 Scofield ............. G01C 21/3697
9,918,199 B2 * 3/2018 Rouda, Jr. ............. H04W 4/027
(Continued)

FOREIGN PATENT DOCUMENTS

EP 3-668-174 B1 * 8/2023

OTHER PUBLICATIONS

Sunitha Safavat, Naveen Naik Sapavath, Danda B. Rawat, Recent advances in mobile edge computing and content caching, Digital Communications and Networks, vol. 6, Issue 2, 2020, pp. 189-194, ISSN 2352-8648,https://doi.org/10.1016/j.dcan.2019.08.004.*
(Continued)

*Primary Examiner* — Renae Feacher
(74) *Attorney, Agent, or Firm* — Ryan, Mason & Lewis, LLP

(57) ABSTRACT

A method includes: acquiring a plurality of historical routes of movement of a plurality of historical users in a geographic area, wherein each historical route includes at least a portion of a plurality of locations; determining, based on the plurality of historical routes and a plurality of current positions of a plurality of users in the geographic area, a set of predicted locations among the plurality of locations that the plurality of users will visit in the future, respectively, wherein the plurality of users use a tour guiding service associated with the plurality of locations that is provided by a mobile network; selecting a set of popular locations from the set of predicted locations based on the number of users among the plurality of users who will visit each predicted location in the set of predicted locations; and scheduling tour guiding resources associated with the set of popular locations.

20 Claims, 8 Drawing Sheets

(51) Int. Cl.
*G06Q 30/0202* (2023.01)
*G06Q 30/0204* (2023.01)

(56) References Cited

U.S. PATENT DOCUMENTS

| | | | | |
|---|---|---|---|---|
| 10,417,925 | B2* | 9/2019 | Klante | G06F 3/165 |
| 11,120,349 | B1* | 9/2021 | Wu | G06Q 10/04 |
| 2010/0257234 | A1* | 10/2010 | Caughey | H04L 67/306 |
| | | | | 709/227 |
| 2011/0213549 | A1* | 9/2011 | Hallas | G01C 21/20 |
| | | | | 701/533 |
| 2012/0102409 | A1* | 4/2012 | Fan | H04W 4/00 |
| | | | | 715/738 |
| 2016/0189228 | A1* | 6/2016 | Vaccari | H04W 4/021 |
| | | | | 705/14.58 |
| 2016/0321551 | A1* | 11/2016 | Priness | G06N 5/047 |
| 2017/0343365 | A1* | 11/2017 | Mokhnatkina | H04W 4/029 |
| 2021/0097893 | A1* | 4/2021 | Klappert | G06F 16/9024 |

OTHER PUBLICATIONS

C. Ferrandez, "How Augmented Reality Travel is Changing the Tourism Industry," https://poplar.studio/blog/how-augmented-reality-travel-is-changing-tourism/, Jul. 16, 2021, 11 pages.

Pocketsights LLC, "The Tour Guide App," https://pocketsights.com/tour-guide-app, Accessed Nov. 17, 2021, 2 pages.

D. Dubrova, "Business Opportunities for Augmented and Virtual Reality Travel," https://theappsolutions.com/blog/development/ar-vr-travel-tourism/, Accessed Nov. 17, 2021, 13 pages.

* cited by examiner

US 12,118,632 B2

METHOD, DEVICE, AND COMPUTER PROGRAM PRODUCT FOR SCHEDULING TOUR GUIDING RESOURCES

RELATED APPLICATION(S)

The present application claims priority to Chinese Patent Application No. 202111227218.7, filed Oct. 21, 2021, and entitled "Method, Device, and Computer Program Product for Scheduling Tour Guiding Resources," which is incorporated by reference herein in its entirety.

FIELD

Implementations of the present disclosure relate to resource scheduling and, more specifically, to a method, a device, and a computer program product for scheduling tour guiding resources in a mobile network.

BACKGROUND

With the development of mobile network technologies, which are now capable of providing increasingly high data transmission speeds, users have been able to access many types of tour guiding services through mobile terminals. For example, when touring a geographic area, users can access video, audio, and various virtual reality, augmented reality, and mixed reality tour guiding resources via the mobile terminals they carry. It will be understood that when a mobile terminal is located in different locations in a mobile network, it is expected to receive different tour guiding resources. While receiving tour guiding resources from a server in the mobile network, the service at the mobile terminal may experience delays and/or freezing. In this case, how to pre-schedule tour guiding resources becomes an important research topic.

SUMMARY

Thus, it is desired to develop and implement a technical solution for scheduling tour guiding resources in a mobile network in a more effective manner. It is expected that the technical solution can be compatible with existing mobile networks and can be used to schedule tour guiding resources in mobile networks in a more effective way by modifying various configurations of existing mobile networks.

According to a first aspect of the present disclosure, a method for scheduling tour guiding resources in a mobile network is provided. The method includes: acquiring a plurality of historical routes of movement of a plurality of historical users in a geographic area, wherein a historical route in the plurality of historical routes comprises at least a portion of a plurality of locations in the geographic area; determining, based on the plurality of historical routes and a plurality of current positions of a plurality of users in the geographic area, a set of predicted locations among the plurality of locations that the plurality of users will visit in the future, respectively, wherein the plurality of users use a tour guiding service associated with the plurality of locations that is provided by a mobile network; selecting a set of popular locations from the set of predicted locations based on the number of users among the plurality of users who will visit each predicted location in the set of predicted locations; and scheduling tour guiding resources associated with the set of popular locations, wherein the tour guiding resources are stored at one or more of a core network layer and an edge computing layer in the mobile network.

According to a second aspect of the present disclosure, an electronic device is provided, comprising: at least one processor; and a memory coupled to the at least one processor, wherein the memory has instructions stored therein that, when executed by the at least one processor, cause the device to perform actions for scheduling tour guiding resources in a mobile network. The actions include: acquiring a plurality of historical routes of movement of a plurality of historical users in a geographic area, wherein a historical route in the plurality of historical routes comprises at least a portion of a plurality of locations in the geographic area; determining, based on the plurality of historical routes and a plurality of current positions of a plurality of users in the geographic area, a set of predicted locations among the plurality of locations that the plurality of users will visit in the future, respectively, wherein the plurality of users use a tour guiding service associated with the plurality of locations that is provided by a mobile network; selecting a set of popular locations from the set of predicted locations based on the number of users among the plurality of users who will visit each predicted location in the set of predicted locations; and scheduling tour guiding resources associated with the set of popular locations, wherein the tour guiding resources are stored at one or more of a core network layer and an edge computing layer in the mobile network.

According to a third aspect of the present disclosure, a computer program product is provided. The computer program product is tangibly stored on a non-transitory computer-readable medium and comprises machine-executable instructions, wherein the machine-executable instructions are used for performing the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of examples rather than limitation. In the accompanying drawings.

DETAILED DESCRIPTION

Example implementations of the present disclosure will be described in more detail below with reference to the accompanying drawings. Although the example implementations of the present disclosure are illustrated in the accompanying drawings, it should be understood that the present disclosure may be implemented in various forms and should not be limited by the implementations illustrated herein. Rather, these implementations are provided in order to make the present disclosure more thorough and complete, and to fully convey the scope of the present disclosure to those skilled in the art.

As used herein, the term "include" and variations thereof mean open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," and the like may refer to different or identical objects. Other definitions, both explicit and implicit, may be included below.

Figure 1:
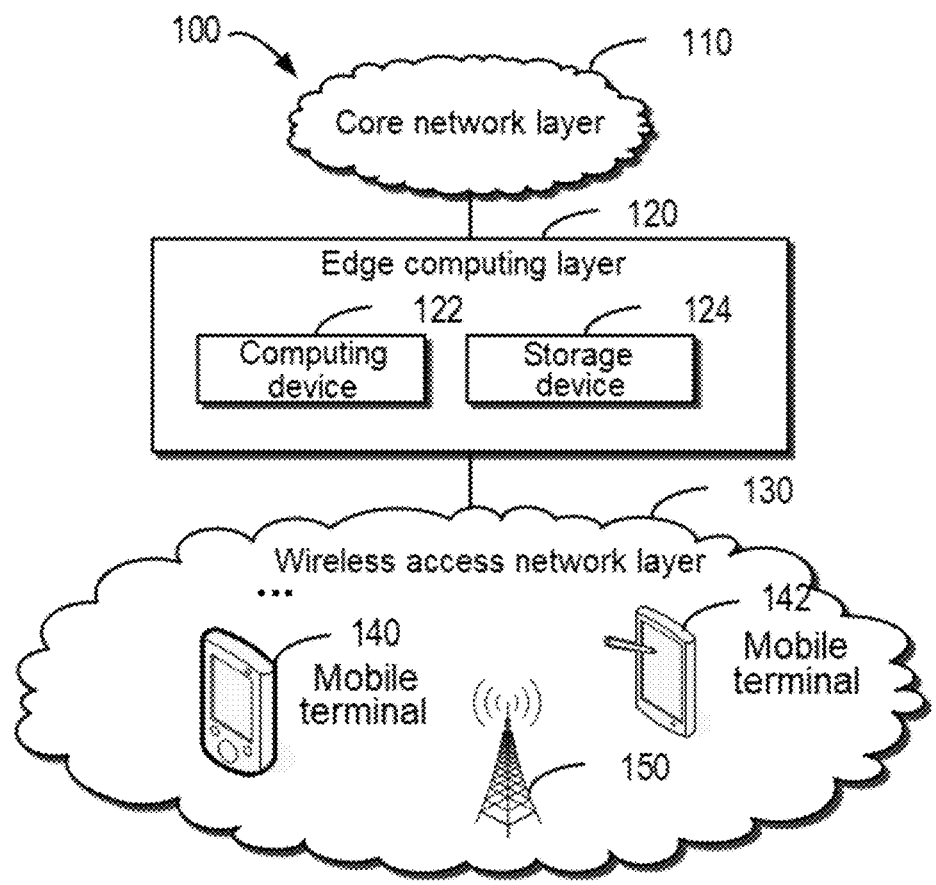
FIG. 1 schematically illustrates a block diagram of a mobile network according to a technical solution in which a method according to an example implementation of the present disclosure may be used.

Referring first to FIG. 1, an application context for an example implementation of the present disclosure is described. FIG. 1 schematically illustrates a block diagram of mobile network 100 according to a technical solution in which a method according to an example implementation of the present disclosure may be used. As shown in FIG. 1, mobile network 100 may include core network layer 110 and wireless access network layer 130. In wireless access network layer 130, mobile terminals 140, . . . , and 142 may communicate via base station 150. With the development of 5G technology, edge computing technology has now been proposed. Edge computing layer 120 may be provided between core network layer 110 and wireless access network layer 130 of mobile network 100. This edge computing layer 120 may include computing device 122 and storage device 124. In this way, certain storage tasks and computing tasks can be migrated closer to wireless access network layer 130 in order to improve the response speed.

A variety of position-based services have been proposed at present. For example, a tour guiding service may be provided to mobile terminals 140, . . . , 142, etc., so that when a user carrying a mobile terminal is within a certain geographic area (e.g., a scenic area, etc.), corresponding tour guiding resources can be provided to the user as the position of the mobile terminal changes. Hereinafter, only a tour guiding application will be used as an example to describe how various tour guiding resources can be scheduled.

Figure 2:
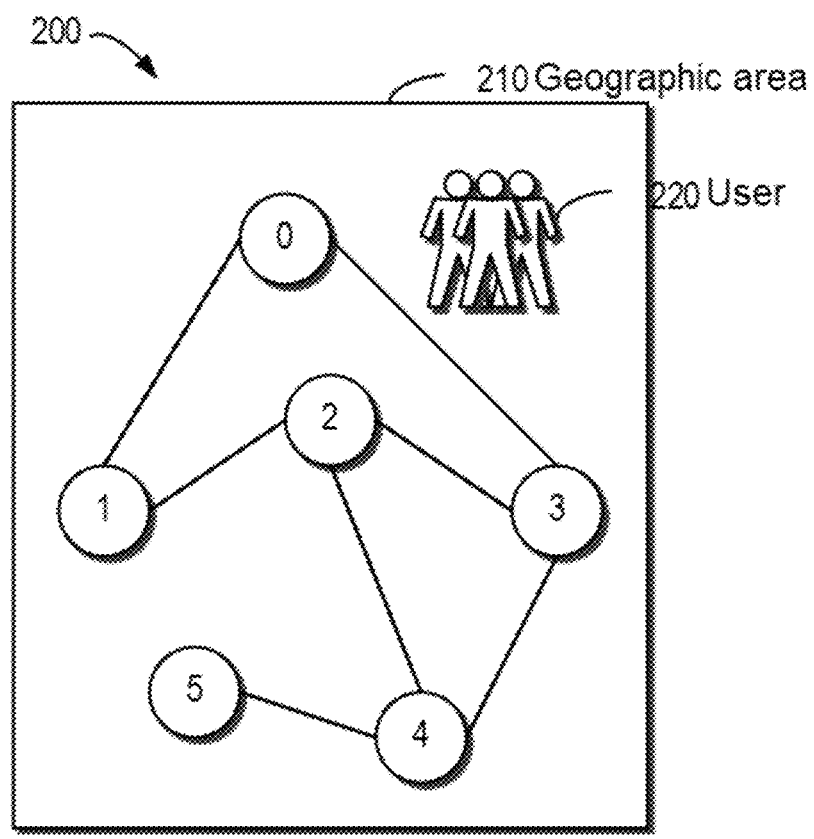
FIG. 2 schematically illustrates a block diagram of user distribution within a geographic area according to an example implementation of the present disclosure.

FIG. 2 schematically illustrates block diagram 200 of the user distribution within a geographic area according to an example implementation of the present disclosure. As shown in FIG. 2, geographic area 210 may include a plurality of locations, e.g., location 0, location 1, location 2, location 3, location 4, location 5, etc. A plurality of users 220 within geographic area 210 may tour the locations in their respective orders according to their expectations. A user may use mobile terminal 140 provided with the tour guiding application to tour in geographic area 210. As the user approaches location 0, mobile terminal 140 may be provided with an introduction to the location, e.g., a summary introduction, historical figures, historical stories, etc.

However, when mobile terminal 140 is in different locations, the tour guiding resources expected to be received will be different, which results in possible delays and/or freezing when the user receives new tour guiding resources. At present, technical solutions have been proposed to pre-load various resources to edge computing layer 120. However, a large number of users in the scenic area will keep moving, which makes it difficult to determine the location that a user will arrive at in the future and thus difficult to pre-determine the resource scheduling strategy.

Figure 3:
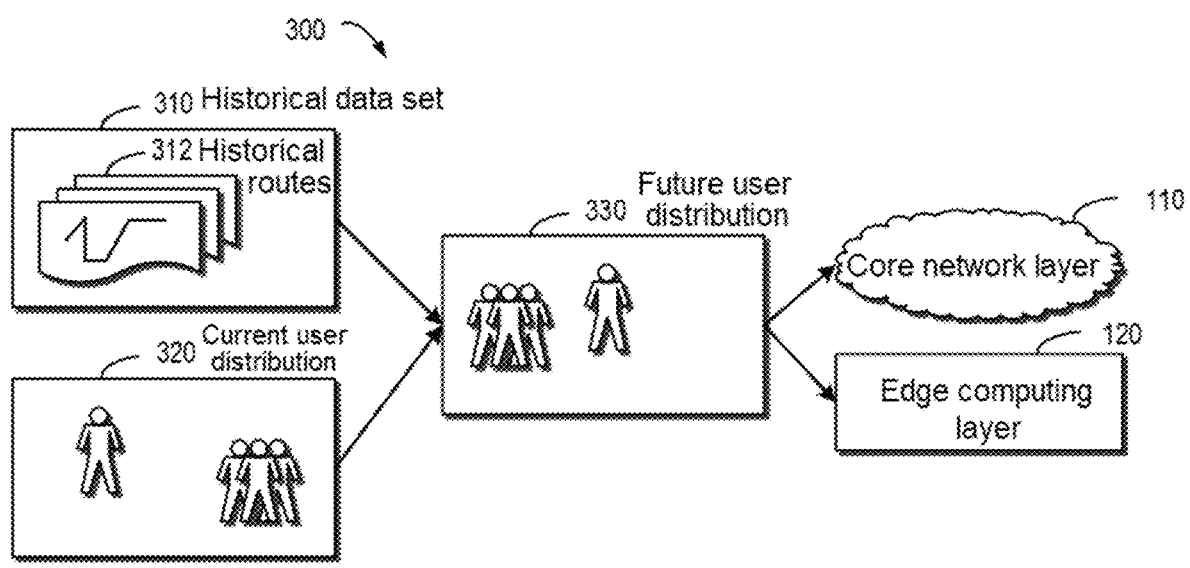
FIG. 3 schematically illustrates a block diagram for scheduling tour guiding resources in a mobile network according to an example implementation of the present disclosure.

To address the shortcomings in existing technical solutions, example implementations of the present disclosure provide a technical solution for scheduling tour guiding resources in a mobile network. In this technical solution, locations that the current plurality of users will visit at future times may be predicted based on historical routes of a plurality of historical users. Further, tour guiding data associated with the locations to be visited may be pre-scheduled. Hereinafter, an overview of the scheduling of tour guiding resources will be described with reference to FIG. 3. FIG. 3 schematically illustrates block diagram 300 for scheduling tour guiding resources in a mobile network according to an example implementation of the present disclosure.

As shown in FIG. 3, historical data set 310 may be acquired. This historical data set 310 may include a plurality of historical routes 312 of movement of a plurality of historical users within geographic area 210. Here, historical route 312 may include at least a portion of a plurality of locations within the geographic area. Assuming that the tour guiding application is configured to provide tour guiding services of the Forbidden City, and that the Forbidden City includes a plurality of scenic spots: the Meridian Gate, the Hall of Supreme Harmony, the Hall of Central Harmony, the Hall of Preserving Harmony, the Palace of Heavenly Purity, the Hall of Mental Cultivation, the Imperial Garden, etc. Here, since users may only visit their favorite scenic spots, each historical route may include a portion of the scenic spots arranged in a different order.

Further, based on the plurality of historical routes 312 and current user distribution 320 of the plurality of users within geographic area 210, future user distribution 330 of the plurality of users at a future time point may be determined, respectively. Tour guiding resources may be scheduled between core network layer 110 and edge computing layer 120 based on future user distribution 330. Specifically, assuming that a large number of users are going to the Imperial Garden and that there are no tour guiding resources associated with the Imperial Garden in edge computing layer 120 at this moment, then tour guiding resources for the Imperial Garden may be pre-loaded to edge computing layer 120. With the example implementation of the present disclosure, the future movement trajectories of most users can be predicted in a more accurate manner based on historical routes, and thus the future position predictions of the users can be accurately estimated, thereby achieving the purpose of pre-loading required tour guiding resources.

According to an example implementation of the present disclosure, historically used tour routes may be used as a training data set to acquire preference information about users' visiting trends and behaviors. When learning users' preferences from the training data set, a posteriori probability may be predicted based on the Bayesian method and using probability statistics. In a specific application context, the Bayesian method may be used to predict the next location that each visitor is likely to visit, aggregate the prediction results for all visitors, and select locations that are likely to become hotspots in the future. Tour guiding resources related to these hotspots may be pushed to the edge computing layer in advance to reduce the time delay of subsequent visits and enhance the user experience.

Figure 4:
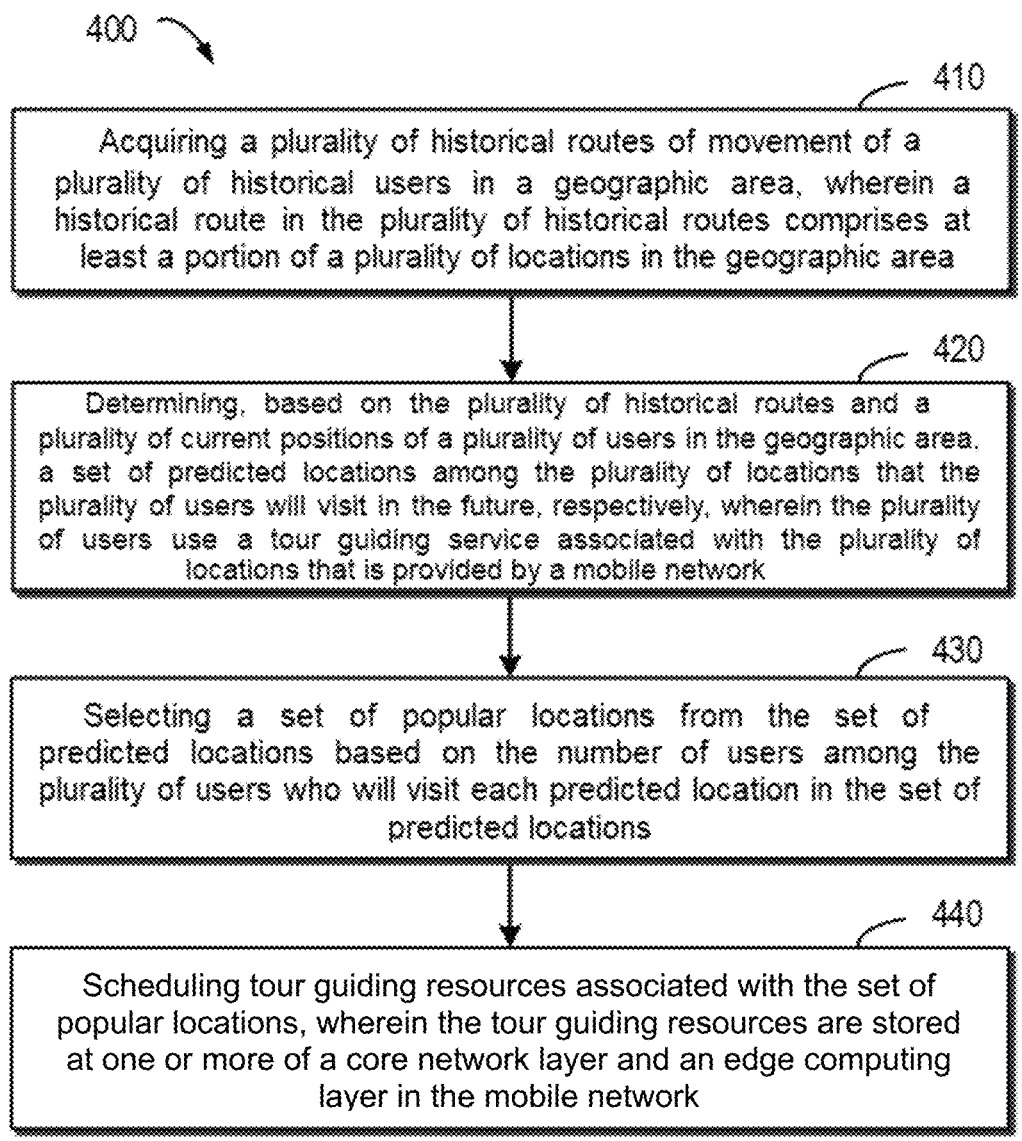
FIG. 4 schematically illustrates a flow chart of a method for scheduling tour guiding resources in a mobile network according to an example implementation of the present disclosure.

Hereinafter, more details of an example implementation according to the present disclosure will be described with reference to FIG. 4. FIG. 4 schematically illustrates a flow chart of method 400 for scheduling tour guiding resources in a mobile network according to an example implementation of the present disclosure. As shown, at block 410, a plurality of historical routes of movement of a plurality of historical users in geographic area 210 may be acquired, where a historical route in the plurality of historical routes may include at least a portion of a plurality of locations in geographic area 210.

For example, one historical route may include: the Meridian Gate—the Hall of Supreme Harmony—the Hall of Central Harmony—the Hall of Preserving Harmony—the Imperial Garden; and another historical route may include: the Meridian Gate—the Hall of Supreme Harmony—the Hall of Central Harmony—the Hall of Preserving Harmony—the Palace of Heavenly Purity—the Hall of Mental Cultivation. Here, historical routes of historical users in different seasons, different dates, different time periods, and different weather conditions may be collected, so that historical data set 310 can reflect the general touring habits of a large number of users. It will be understood that historical users here may include users who use the tour guiding service and may also include general users who do not use the tour guiding service.

At block 420, based on the plurality of historical routes and a plurality of current positions of a plurality of users in geographic area 210, a set of predicted locations among the plurality of locations that the plurality of users will visit in the future may be determined respectively. Here, the plurality of users use a tour guiding service associated with the plurality of locations that is provided by the mobile network. According to an example implementation of the present disclosure, the current position of each user may be collected in real time directly from the mobile terminal carried by the user. Alternatively and/or additionally, current positions of the users may be collected at a predetermined time interval. For example, the user positions may be collected every 5 minutes or at other time intervals.

It will be understood that the future time here may be a predetermined time point after the current time point, e.g., 10 minutes later, 15 minutes later, or other future time points. It may be possible to determine, according to the user touring habits extracted from the plurality of historical routes, which location each of the plurality of users will visit in the future. For example, the next destination of each user may be determined based on the Bayesian method. For ease of description, the terms shown in Table 1 below are first introduced.

TABLE 1

Terminology set

| No. | Symbol | Description |
| --- | --- | --- |
| 1 | $C_k$ | The kth location in the geographic area, where k = 1,2, ... K, K being the number of locations in the geographic area. |
| 2 | x | The location where a user currently located in the geographic area is located. |
| 3 | n | The number of historical users involved in the historical data set. |
| 4 | $n_{ck}$ | The number of historical users who visited location $c_k$ that is obtained based on the historical data set. |
| 5 | $n_{x,ck}$ | The number of historical users who visited location x prior to visiting location $c_k$ that is obtained based on the historical data set. |
| 6 | P(x) | The probability that a user visits location x that is obtained based on the historical data set. |
| 7 | $P(c_k)$ | The priori probability that a user visits location $c_k$ that is obtained based on the historical data set. |
| 8 | $P(x|c_k)$ | The conditional probability obtained based on the historical data set, which indicates the probability that a user visited location x prior to visiting location $c_k$. |
| 9 | $P(c_k|x)$ | The posteriori probability obtained based on the historical data set, which indicates the probability that a user will visit location $c_k$ after having already visited location x. |
| 10 | N | The number of all users currently located in the geographic area. |
| 11 | i | A user currently located in the geographic area, i ≤ N. |
| 12 | $R_i$ | The prediction result for user i, i.e., which location the user will visit next. |
| 13 | $R_{ck,i}$ | Whether the prediction result for user i is equal to $c_k$, i.e., whether the user will go to location $c_k$ next. |
| 14 | $N_{ck}$ | The number of all users who will visit location $c_k$. |

Hereinafter, the equation used to determine the user's position in the future will be constructed based on the symbols shown in Table 1 above. It will be understood that the symbols used in the equations below have the same meaning as those shown in Table 1 and thus will not be repeated at each equation. According to an example implementation of the present disclosure, in order to determine a set of predicted locations, a conditional probability that the plurality of historical users visit at least one other location prior to visiting a given location in the plurality of locations may be determined based on the plurality of historical routes. Further, the set of predicted locations that the plurality of users will visit in the future may be determined based on the conditional probability. Specifically, it is possible to determine statistically, based on the historical routes, which other location a historical user prefers to visit after visiting a given location.

According to an example implementation of the present disclosure, for each location $c_k$ in the plurality of locations, the priori probability that a historical user visits the location may be determined. For example, the priori probability $P(c_k)$ that a historical user visits location $c_k$ may be determined based on Equation 1:

$$P(c_k) = \frac{n_{c_k}}{n} \qquad \text{Equation 1}$$

That is, the priori probability $P(c_k)$ may be determined based on the ratio of the number $n_{c_k}$ of historical users who visited location $c_k$ to the number of all historical users. Assuming that location $c_k$ represents the Imperial Garden, the historical data set involves 10,000 historical users, and 1,000 of them visited the Imperial Garden, then the priori probability associated with the Imperial Garden that is determined based on the historical data set is 1,000/10,000=0.1. All locations may be processed based on Equation 1. In this way, the priori probabilities associated with the locations such as the Meridian Gate, the Hall of Supreme Harmony, the Hall of Central Harmony, the Hall of Preserving Harmony, the Palace of Heavenly Purity, and the Hall of Mental Cultivation may be determined respectively.

According to an example implementation of the present disclosure, in order to determine the conditional probability, a first number of users among the plurality of users who visited the given location may be determined. Further, for other locations in the plurality of locations different from the given location, a second number of users among the plurality of users who visited the other locations prior to visiting the given location may be determined. A conditional probability for the other locations is determined based on the first number of users and the second number of users. It will be understood that the conditional probability here is a conditional probability $P(x|c_k)$ determined based on the historical data set. Specifically, the conditional probability $P(x|c_k)$ may be determined based on Equation 2 as follows:

$$P(x|c_k) = \frac{n_{x,c_k}}{n_{c_k}} \qquad \text{Equation 2}$$

Equation 2 indicates that the conditional probability $P(x|c_k)$ may be determined based on the ratio of the number of historical users who visited location x prior to visiting location $c_k$ to the number of historical users who visited location $c_k$. With the example implementation of the present disclosure, the touring habits of the historical users in the historical data set may be counted, and the touring habits may then be used to predict the next destination of each current user that is currently in the geographic area.

According to an example implementation of the present disclosure, the conditional probability $P(x|c_k)$ determined in Equation 2 may further be used to predict the next destination of each current user respectively. Specifically, for a given user among the plurality of users, a predicted location that the given user will visit in the future may be determined based on the conditional probability. In other words, the location where the given user will be located in the future is determined based on the location x where the given user is currently located and the conditional probability $P(x|c_k)$. Specifically, a visiting probability $P(c_k|x)$ that the given user will visit each of the other locations in the plurality of locations in the future may be determined respectively based on the conditional probability:

$$P(c_k|x) = \frac{P(x|c_k)P(c_k)}{P(x)} \qquad \text{Equation 3}$$

Here, the specific value of $P(x|c_k)$ may be determined based on Equation 2. It will be understood that x here is the location where the given user is located. For example, the specific value of x may be determined based on the location closest to the given user. $c_k$ may be any one of the plurality of locations. In this way, the visiting probabilities that the given user visits various locations may be determined one by one. Assuming that the geographic area includes K locations, then K visiting probabilities may be determined.

Figure 5:
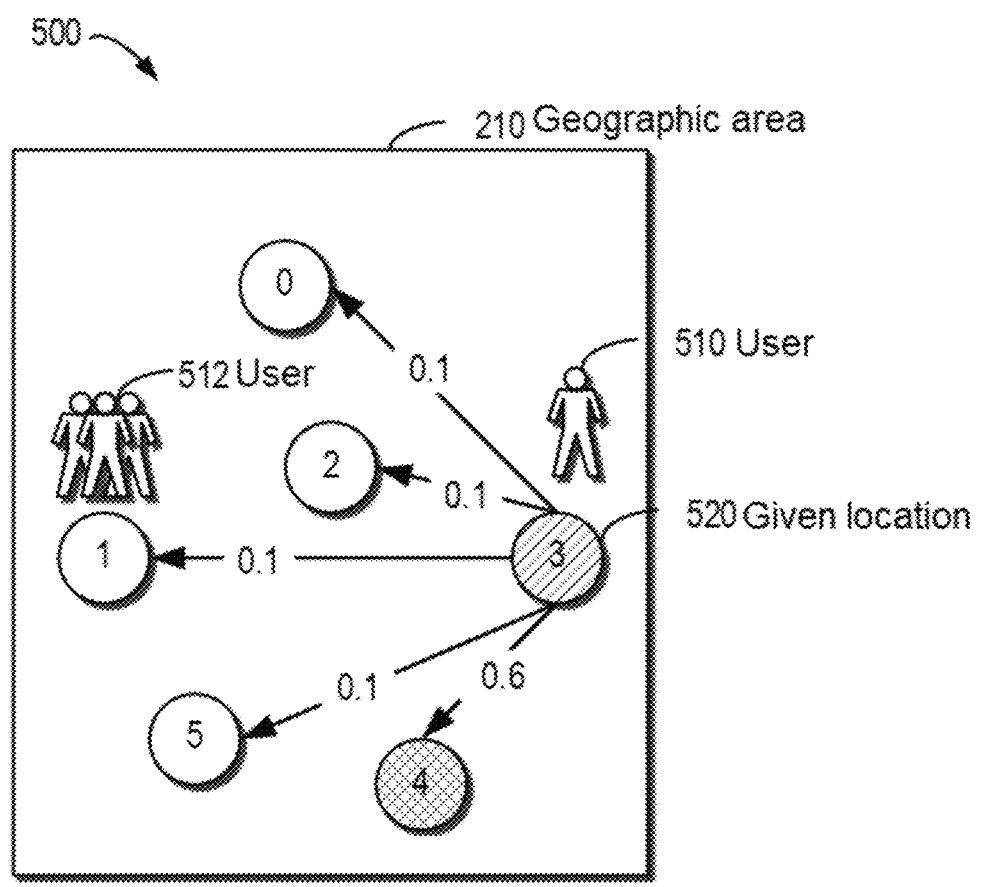
FIG. 5 schematically illustrates a block diagram for determining a location that a given user will arrive at in the future according to an example implementation of the present disclosure.

Further, the predicted location that the given user will visit in the future may be determined based on a comparison of the determined K visiting probabilities. According to an example implementation of the present disclosure, among the visiting probabilities associated with the other locations, the location associated with the maximum probability may be identified as the predicted location. Specifically, the location with the maximum visiting probability may be selected based on Equation 4 as follows:

$$R_i = \max_{k=1,\ldots,K} P(c_k|x) = \max_{k=1,\ldots,K} \frac{P(x|c_k)P(c_k)}{P(x)} \qquad \text{Equation 4}$$

where $R_i$ denotes the prediction result for user i, i.e., which location the user i will visit next. Hereinafter, more details of the visiting probability that a user goes to each of the other locations will be described with reference to FIG. 5. FIG. 5 schematically illustrates block diagram 500 for determining a location that a given user will arrive at in the future according to an example implementation of the present disclosure. As shown in FIG. 5, for user 510, the probabilities that user 510 goes to other locations may be determined respectively based on the equation described above. Assuming that user 510 is located at given location 520, then the probabilities (as shown by respective arrows in the figure) that user 510 goes to locations 0, 2, 1, 5, and 4 may be determined respectively at this point. As shown in FIG. 5, the probability that user 510 goes to location 4 in the future, which is 0.6, is greater than the probabilities that the user goes to the other locations, and thus location 4 may be used as the next destination of user 510.

It will be understood that the above description only uses user 510 in FIG. 5 as a specific example of a given user to describe how to determine the user's next destination. If there are also a plurality of other users 512 in geographic area 210, similar processing may be performed for each of the plurality of other users 512. Further, the following may be determined based on Equation 5: Whether the prediction result for user i is equal to $c_k$, i.e., whether the user will go to location $c_k$ next.

$$R_{c_k,i} = \begin{cases} 0 & R_i \neq c_k, k = 1, \ldots, K \\ 1 & R_i = c_k, k = 1, \ldots, K \end{cases} \qquad \text{Equation 5}$$

Figure 6:
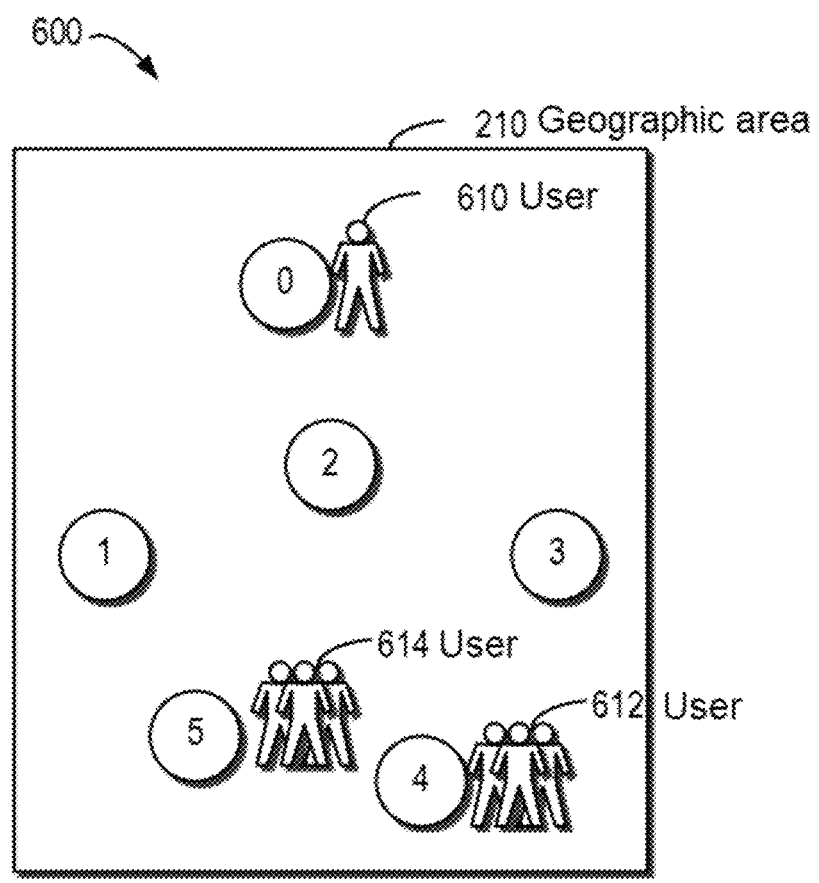
FIG. 6 schematically illustrates a block diagram of the distribution of a plurality of users in the future according to an example implementation of the present disclosure.

According to an example implementation of the present disclosure, the method described above may be performed respectively for each user i among the plurality of current users, and in this way, the predicted location that each user will visit in the future can be accurately estimated based on historical experience. FIG. 6 schematically illustrates block diagram 600 of the distribution of a plurality of users in the future according to an example implementation of the present disclosure. As shown in FIG. 6, a plurality of users in a geographic area will exhibit different distributions at future time points, e.g., user 610 will be located at location 0 in the future, a plurality of users 614 will be located at location 5 in the future, a plurality of users 612 will go to location 4 in the future, etc. Then, further processing may be performed based on a set of predicted locations that the plurality of users will visit.

Returning to FIG. 4, more information about the selection of popular locations based on the predicted locations will be described. At block 430 of FIG. 4, a set of popular locations may be selected from the set of predicted locations based on the number of users among the plurality of users who will visit each predicted location in the set of predicted locations. In this step, the set of predicted locations that all users may arrive at may be generated based on the predicted location of each user. Specifically, the number of users who may visit location $c_k$ at a future time may be determined based on Equation 6 as follows.

$$N_{c_k} = \Sigma_{i=1}^{N} R_{c_k,i} \ (k=1, \ldots, K) \quad \text{Equation 6}$$

With Equation 6, it is possible to determine, based on whether user i will visit location $c_k$ in the future, how many people will visit location $c_k$ in the future. Further, popular locations may be selected based on the number of users who will visit each location in the future. In other words, a location corresponding to the greatest number of users is selected as a popular location. According to an example implementation of the present disclosure, the processing shown in Equation 6 may be performed for each location included in the geographic area to predict how many users will come to each location.

It will be understood that the forgoing uses only Equations 1 to 6 to describe examples of predicting, based on the historical data set, the location to which a user is likely to go. According to an example implementation of the present disclosure, a variety of other factors may be further taken into consideration in predicting the next destination of the user. Typically, users are more inclined to tour famous scenic spots, and thus high weights may be assigned to famous scenic spots. For another example, the next destination of a user may be further determined based on factors related to the user's current tour, such as the time of day, the season, and the weather. It may be considered that the user prefers to tour outdoor scenic spots during lighter hours in a day, and indoor scenic spots during darker hours, such as in the evening. For another example, the next destination may be predicted based on the tour routes that the user has already taken. For another example, the next destination may be further determined based on the distance between the user's current location and surrounding locations, and so on.

According to an example implementation of the present disclosure, in order to select the set of popular locations from the set of predicted locations, the set of predicted locations may be ranked by the number of users who will visit each predicted location in the set of predicted locations. Assuming that the current number of users is 5,000 and that the predicted number for each location is as shown in Table 2 below:

TABLE 2

| No. | Location | Predicted number |
|---|---|---|
| 1 | the Meridian Gate | 250 |
| 2 | the Hall of Supreme Harmony | 500 |
| 3 | the Hall of Central Harmony | 600 |
| 4 | the Hall of Preserving Harmony | 350 |
| ... | ... | ... |

TABLE 2-continued

| No. | Location | Predicted number |
|---|---|---|
| ... | the Imperial Garden | 150 |
| ... | ... | ... |
| K | ... | ... |

The predicted numbers as shown in Table 2 may be ranked in a descending order to obtain the ranking shown in Table 3.

TABLE 3

List of locations ranked by numbers from large to small

| Ranking | Location | Predicted number |
|---|---|---|
| 1 | the Hall of Central Harmony | 600 |
| 2 | the Hall of Supreme Harmony | 500 |
| 3 | the Hall of Preserving Harmony | 350 |
| 4 | the Meridian Gate | 250 |
| ... | ... | ... |
| ... | the Imperial Garden | 150 |
| ... | ... | ... |
| K | ... | ... |

According to an example implementation of the present disclosure, the top-ranked (e.g., top three or other number) locations may be selected from Table 3. As shown in Table 3, "the Hall of Central Harmony," "the Hall of Supreme Harmony," and "the Hall of Preserving Harmony" may be selected, and the tour guiding resources associated with these locations may be preferentially loaded into the edge computing layer.

At block 440, tour guiding resources associated with the set of popular locations are scheduled, wherein the tour guiding resources are stored at one or more of a core network layer and an edge computing layer in the mobile network. Specifically, if it is determined that the tour guiding resources are not stored at the edge computing layer, a request is sent to the core network for loading the tour guiding resources from the core network to the edge computing layer. If it is determined that the tour guiding resources have been stored in the edge computing layer, there is no need to perform additional loading operations. With the example implementation of the present disclosure, before a large number of users arrive at a popular location, tour guiding resources may be pre-loaded to the edge computing layer that is closer to mobile terminals carried by the users. In this way, the tour guiding resources that the users expect to view are already located in the edge computing layer, and thus the users do not have to wait for the transmission of the tour guiding resources from the remote core network layer.

According to an example implementation of the present disclosure, the edge computing layer may provide, in response to a fetch request from a mobile terminal of a user among the plurality of users, a portion of the tour guiding resources associated with a current location of the mobile terminal from the edge computing layer to the mobile terminal. Assuming that a user is on the way to the Hall of Supreme Harmony. When the mobile terminal approaches the Hall of Supreme Harmony, the mobile terminal may automatically send a request to a server device in the edge computing layer to fetch the tour guiding resources associated with the Hall of Supreme Harmony. At this time, a resource scheduler in the edge computing layer may transmit the tour guiding resources to the mobile terminal.

According to an example implementation of the present disclosure, the tour guiding resources include data of at least any of the following services associated with the set of popular locations: a streaming media service, a virtual reality service, an augmented reality service, and a mixed reality service. With the example implementation of the present disclosure, data may be provided to the user in a variety of formats via a tour guiding application, thereby providing the user with a comprehensive understanding of information about various aspects of each location. For example, streaming media data, including audio/video, may be provided to the user to introduce the architectural style, historical story, etc. about the location. Three-dimensional virtual reality animations of historical changes of buildings at each location may be provided to the user, so that the user can understand historical features of each location.

In the tour guiding application scenario, augmented reality services may be provided when the mobile network supports 5G schemes with high data rates and low latency computing. Augmented reality is a technology that computes the position and angle of a collected image in real time and provides corresponding multimedia information. The goal of this technology is to display a virtual world at a mobile terminal and allow interaction with the real world. By overlaying additional information on the surrounding environment, augmented displays can merge the real world with the virtual world. For example, when a user uses a camera device of the mobile terminal to focus on the Hall of Supreme Harmony, parameters such as the length, width, and height of each part may be superimposed and displayed on the image of the Hall of Supreme Harmony, and so on. Further, mixed reality services may be provided to the user. For another example, when a user visits a museum or gallery, augmented reality services can enhance the user's experience and bring better visual effects. As the user approaches each exhibit, the mobile terminal can present information related to the exhibit.

Figure 7:
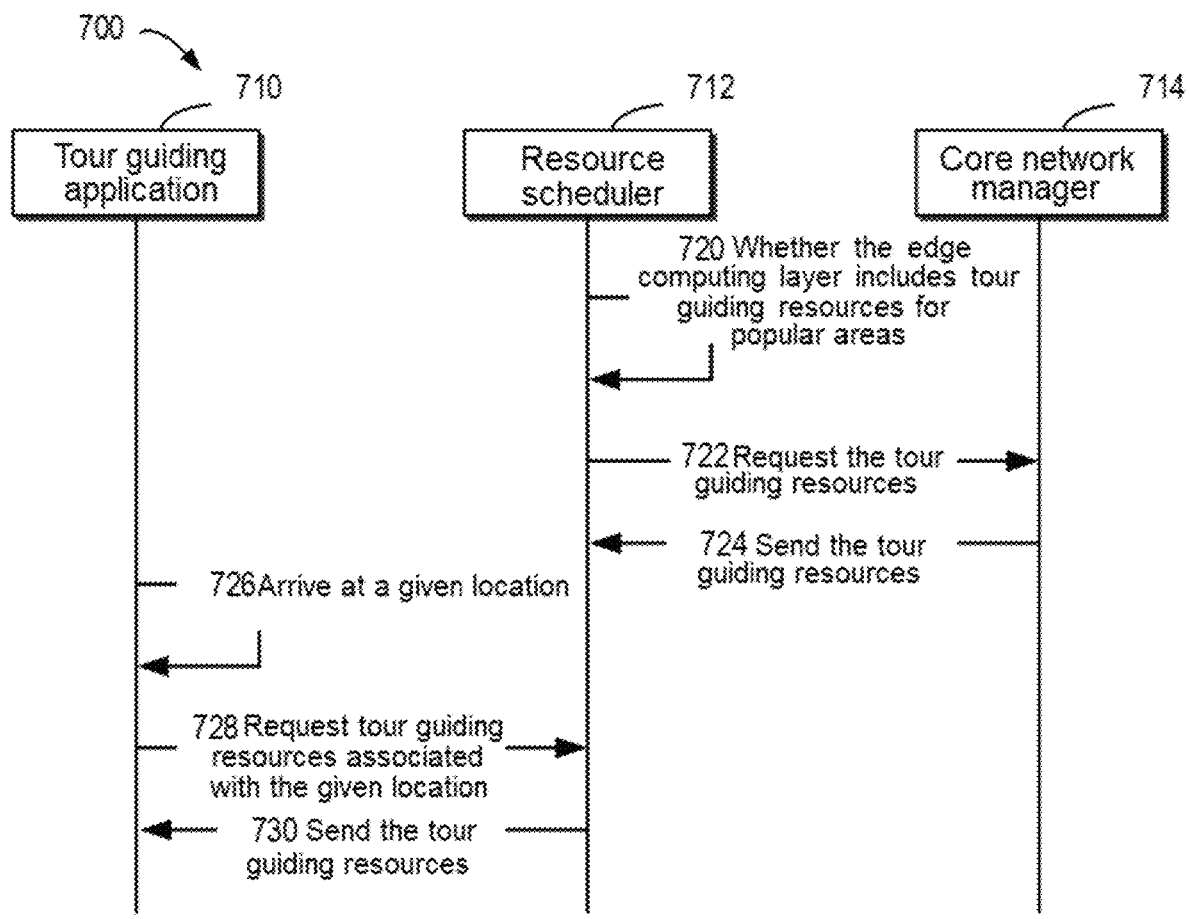
FIG. 7 schematically illustrates a block diagram of interaction between a plurality of devices according to an example implementation of the present disclosure.

Hereinafter, a process for scheduling tour guiding resources according to an example implementation of the present disclosure will be described with reference to FIG. 7. FIG. 7 schematically illustrates block diagram 700 of interaction between a plurality of devices according to an example implementation of the present disclosure. In the context of the present disclosure, method 400 described above may be performed by resource scheduler 712. As shown in FIG. 7, a user may use tour guiding application 710 to receive tour guiding resources while touring in the Forbidden City. Resource scheduler 712 may, for example, run in the edge computing layer and periodically execute method 400 described above. When a change in the distribution of users within a geographic area is detected, it can be determined 720 whether the edge computing layer includes tour guiding resources for popular areas. If the determination result is "no," resource scheduler 712 may request 722 related tour guiding resources from core network manager 714.

Upon receiving the request from resource scheduler 712, core network manager 714 may send 724 the tour guiding resources to a specified position in the edge computing layer. At this point, the tour guiding resources are pre-loaded into the edge computing layer for invocation by tour guiding application 710. The user using tour guiding application 710 may move freely in the geographic area, and when reaching 726 a given location, tour guiding application 710 may automatically request 728 tour guiding resources associated with the given location from resource scheduler 712. At this point, resource scheduler 712 may send 730 to tour guiding application 710 tour guiding resources that have already been pre-loaded into the edge computing layer. In this way, the time that the user waits for the transmission of the tour guiding resources can be reduced, thereby alleviating possible delays and/or freezing in the tour guiding service at tour guiding application 710.

Examples of methods according to the present disclosure have been described in detail above with reference to FIGS. 2 to 7, and an implementation of a corresponding apparatus will be described below. Specifically, an apparatus for scheduling tour guiding resources in a mobile network is provided. The apparatus includes: an acquiring module configured to acquire a plurality of historical routes of movement of a plurality of historical users in a geographic area, wherein a historical route in the plurality of historical routes comprises at least a portion of a plurality of locations in the geographic area; a determining module configured to determine, based on the plurality of historical routes and a plurality of current positions of a plurality of users in the geographic area, a set of predicted locations among the plurality of locations that the plurality of users will visit in the future, respectively, wherein the plurality of users use a tour guiding service associated with the plurality of locations that is provided by the mobile network; a selecting module configured to select a set of popular locations from the set of predicted locations based on the number of users among the plurality of users who will visit each predicted location in the set of predicted locations; and a scheduling module configured to schedule tour guiding resources associated with the set of popular locations, wherein the tour guiding resources are stored at one or more of a core network layer and an edge computing layer in the mobile network. According to an example implementation of the present disclosure, the above apparatus further includes modules for executing other steps in method 400.

Figure 8:
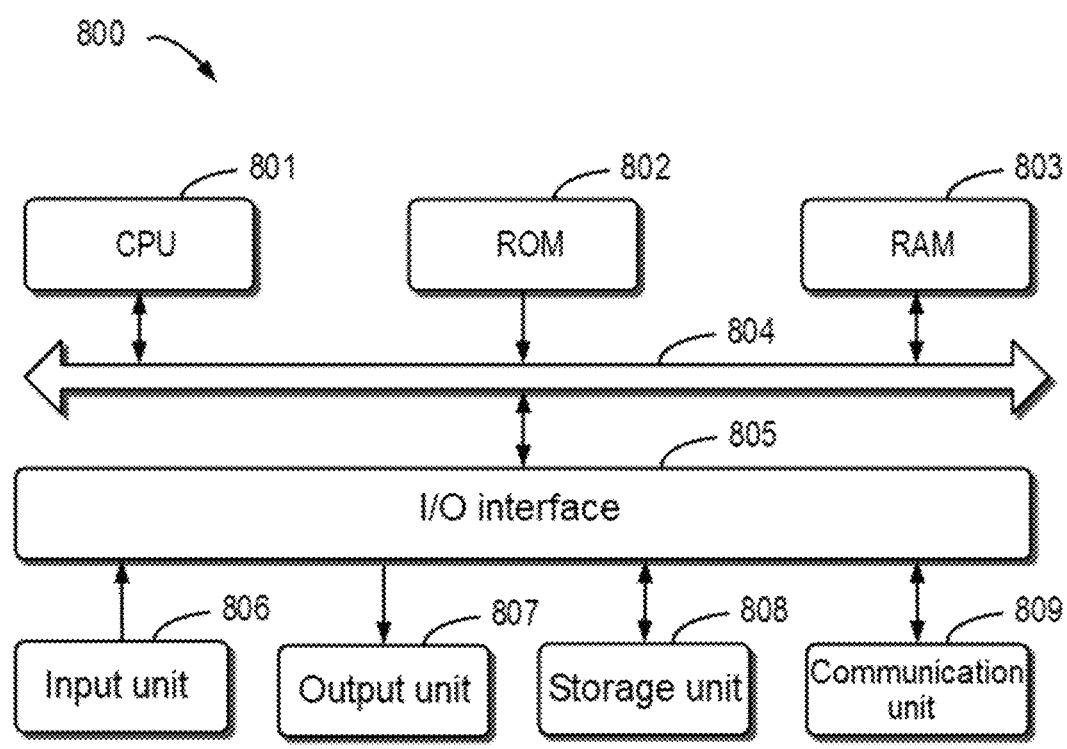
FIG. 8 schematically illustrates a block diagram of a device for scheduling tour guiding resources according to an example implementation of the present disclosure.

FIG. 8 schematically illustrates a block diagram of device 800 for scheduling tour guiding resources according to an example implementation of the present disclosure. As shown in the figure, device 800 includes general processing unit (CPU) 801 which can perform various appropriate actions and processes according to computer program instructions stored in read only memory (ROM) 802 or computer program instructions loaded from storage unit 808 into random access memory (RAM) 803. Various programs and data required for the operation of device 800 may also be stored in RAM 803. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various processes and processing procedures described above, such as method 400, may be performed by CPU 801. For example, in some implementations, the methods mentioned above may be implemented as a computer software program that is tangibly embodied on a machine-readable medium, for example, storage unit 808. In some implementations, part of or all the computer program may be loaded and/or installed onto device 800 via ROM 802 and/or communication unit 809. When the computer program is loaded into RAM 803 and executed by CPU 801, one or more steps of the methods described above may be performed. Alternatively, in other implementations, CPU 801 may also be configured in any other suitable manner to implement the above processes/methods.

According to an example implementation of the present disclosure, an electronic device is provided, including: at least one processor; and a memory coupled to the at least one processor, wherein the memory has instructions stored therein that, when executed by the at least one processor, cause the device to perform actions for scheduling tour guiding resources in a mobile network. The actions include: acquiring a plurality of historical routes of movement of a plurality of historical users in a geographic area, wherein a historical route in the plurality of historical routes comprises at least a portion of a plurality of locations in the geographic area; determining, based on the plurality of historical routes and a plurality of current positions of a plurality of users in the geographic area, a set of predicted locations among the plurality of locations that the plurality of users will visit in the future, respectively, wherein the plurality of users use a tour guiding service associated with the plurality of locations that is provided by a mobile network; selecting a set of popular locations from the set of predicted locations based on the number of users among the plurality of users who will visit each predicted location in the set of predicted locations; and scheduling tour guiding resources associated with the set of popular locations, wherein the tour guiding resources are stored at one or more of a core network layer and an edge computing layer in the mobile network.

According to an example implementation of the present disclosure, determining the set of predicted locations includes: determining, based on the plurality of historical routes, a conditional probability that the plurality of historical users visit at least one other location prior to visiting a given location in the plurality of locations; and determining, based on the conditional probability, the set of predicted locations that the plurality of users will visit in the future.

According to an example implementation of the present disclosure, determining the conditional probability includes: determining a first number of users of historical users among the plurality of historical users who visited the given location; determining, for other locations in the plurality of locations different from the given location, a second number of users among the plurality of historical users who visited the other locations prior to visiting the given location; and determining a conditional probability for the other locations based on the first number of users and the second number of users.

According to an example implementation of the present disclosure, determining the set of predicted locations based on the conditional probability includes: for a given user among the plurality of users, determining, based on the conditional probability, a predicted location that the given user will visit in the future; and generating the set of predicted locations based on the predicted location.

According to an example implementation of the present disclosure, determining the predicted location that the given user will visit in the future includes: determining, based on the conditional probability, a visiting probability that the given user will visit each of the other locations in the plurality of locations in the future; and determining, based on a comparison of the visiting probabilities, the predicted location that the given user will visit in the future.

According to an example implementation of the present disclosure, determining the predicted location based on a comparison of the visiting probabilities includes: identifying, among visiting probabilities associated with the other locations, a location associated with the maximum probability as the predicted location.

According to an example implementation of the present disclosure, selecting the set of popular locations from the set of predicted locations includes: ranking the set of predicted locations by the number of users who will visit each predicted location in the set of predicted locations; and selecting the set of popular locations from the set of predicted locations that have been ranked.

According to an example implementation of the present disclosure, scheduling the tour guiding resources includes: sending, in response to determining that the tour guiding resources are not stored in the edge computing layer, a request to the core network for loading the tour guiding resources from the core network to the edge computing layer;

According to an example implementation of the present disclosure, the actions further include: providing, in response to a fetch request from a mobile terminal of a user among the plurality of users, a portion of the tour guiding resources associated with a current position of the mobile terminal from the edge computing layer to the mobile terminal.

According to an example implementation of the present disclosure, the tour guiding resources include data of at least any of the following services associated with the set of popular locations: a streaming media service, a virtual reality service, an augmented reality service, and a mixed reality service.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided, the computer-readable medium storing machine-executable instructions which, when being executed by at least one processor, cause the at least one processor to implement the method according to the present disclosure.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, or partly on a user computer, or as a stand-alone software package, or partly on a user computer and partly on a remote computer, or entirely on a remote computer or server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various implementations of the present disclosure have been described above. The above description is illustrative and not exhaustive, and is not limited to the various implementations disclosed. Numerous modifications and alterations will be apparent to persons of ordinary skill in the art without departing from the scope and spirit of the illustrated implementations. The selection of terms as used herein is intended to best explain principles and practical applications of the various implementations or improvements to technologies on the market, so as to enable persons of ordinary skill in the art to understand the implementations disclosed herein.

What is claimed is:

1. A method for scheduling tour guiding resources in a mobile network, the mobile network comprising a core network layer, an edge computing layer, and a wireless access layer, the edge computing layer comprising a plurality of edge devices disposed between the core network layer and the wireless access layer, the wireless access layer comprising a plurality of mobile terminals and one or more base stations configured for wireless communication with the mobile terminals, the method comprising:

acquiring, in at least one of the core network layer and the edge computing layer of the mobile network, a plurality of historical routes of movement of a plurality of historical users in a geographic area, wherein a historical route in the plurality of historical routes comprises at least a portion of a plurality of locations in the geographic area;

tracking a plurality of current positions of a plurality of users in the geographic area by processing, in at least the wireless access layer, signals associated with respective mobile terminals of the plurality of users, wherein the tracking comprises repeatedly collecting the current positions of the users from their respective mobile terminals over time via the one or more base stations of the wireless access layer;

determining, in at least one of the core network layer and the edge computing layer of the mobile network, based on the plurality of historical routes and the plurality of current positions of the plurality of users in the geographic area, a set of predicted locations among the plurality of locations that the plurality of users will visit in the future, respectively, wherein the set of predicted locations is updated over time based on changes in the current positions of the users as collected from their respective mobile terminals;

selecting, in at least one of the core network layer and the edge computing layer of the mobile network, a set of popular locations from the set of predicted locations based on a number of users among the plurality of users who will visit each predicted location in the set of predicted locations; and scheduling, in at least one of the core network layer and the edge computing layer of the mobile network, tour guiding resources associated with the set of popular locations, wherein the tour guiding resources associated with the set of popular locations are stored at one or more of the core network layer and the edge computing layer in the mobile network;

wherein the determining and selecting further comprise:
generating a predicted next location for each of the plurality of users, utilizing one or more conditional probabilities determined based on one or more previous locations;
aggregating the predicted next locations across the plurality of users; ranking the aggregated predicted next locations; and
selecting one or more portions of the tour guiding resources associated with the set of popular locations based on the aggregated predicted next locations;

wherein the scheduling further comprises:
sending, in response to determining in a resource scheduler of the edge computing layer that at least one of the one or more selected portions of the tour guiding resources associated with the set of popular locations has not already been pre-loaded into the edge computing layer, a request from the resource scheduler of the edge computing layer to a core network manager of the core network layer for obtaining the at least one of the one or more selected portions of the tour guiding resources associated with the set of popular locations; and
pre-loading the at least one of the one or more selected portions of the tour guiding resources, obtained by the resource scheduler of the edge computing layer from the core network manager of the core network layer in response to the request from the resource scheduler of the edge computing layer, into one or more particular ones of the edge devices of the edge computing layer based on the ranking of the aggregated predicted next locations; and
repeating the sending and pre-loading based on the updating of the set of predicted locations; and wherein the method further comprises:
providing, in response to a fetch request from a given one of the mobile terminals of a given one of the users, a portion of the tour guiding resources associated with a current position of the given user from the one or more particular edge devices of the edge computing layer to the given mobile terminal.

2. The method according to claim 1, wherein determining the set of predicted locations comprises:
determining, based on the plurality of historical routes, a conditional probability that the plurality of historical users visit at least one other location prior to visiting a given location in the plurality of locations; and
determining, based on the conditional probability, the set of predicted locations that the plurality of users will visit in the future.

3. The method according to claim 2, wherein determining the conditional probability comprises:
determining a first number of users of historical users among the plurality of historical users who visited the given location;
determining, for other locations in the plurality of locations different from the given location, a second number of users among the plurality of historical users who visited the other locations prior to visiting the given location; and
determining a conditional probability for the other locations based on the first number of users and the second number of users.

4. The method according to claim 2, wherein determining the set of predicted locations based on the conditional probability comprises: for a given user among the plurality of users,
determining, based on the conditional probability, a predicted location that the given user will visit in the future; and
generating the set of predicted locations based on the predicted location.

5. The method according to claim 4, wherein determining the predicted location that the given user will visit in the future comprises:
determining, based on the conditional probability, a visiting probability that the given user will visit each of multiple other locations in the plurality of locations in the future; and
determining, based on a comparison of the visiting probabilities, the predicted location that the given user will visit in the future.

6. The method according to claim 5, wherein determining the predicted location based on a comparison of the visiting probabilities comprises:
identifying, among visiting probabilities associated with the other locations, a location associated with a maximum probability as the predicted location.

7. The method according to claim 1, wherein selecting the set of popular locations from the set of predicted locations comprises:
ranking the set of predicted locations by the number of users who will visit each predicted location in the set of predicted locations; and
selecting the set of popular locations from the set of predicted locations that have been ranked.

8. The method according to claim 1, wherein the tour guiding resources include data of at least any of the following services associated with the set of popular locations: a streaming media service, a virtual reality service, an augmented reality service, and a mixed reality service.

9. An electronic device, comprising:
at least one processor; and
a memory coupled to the at least one processor, wherein the memory has instructions stored therein that, when executed by the at least one processor, cause the electronic device to perform actions for scheduling tour guiding resources in a mobile network, the mobile network comprising a core network layer, an edge computing layer, and a wireless access layer, the edge computing layer comprising a plurality of edge devices disposed between the core network layer and the wireless access layer, the wireless access layer comprising a plurality of mobile terminals and one or more base stations configured for wireless communication with the mobile terminals, the actions comprising:
acquiring, in at least one of the core network layer and the edge computing layer of the mobile network, a plurality of historical routes of movement of a plurality of historical users in a geographic area, wherein a historical route in the plurality of historical routes comprises at least a portion of a plurality of locations in the geographic area;
tracking a plurality of current positions of a plurality of users in the geographic area by processing, in at least the wireless access layer, signals associated with respective mobile terminals of the plurality of users, wherein the tracking comprises repeatedly collecting the current positions of the users from their respective mobile terminals over time via the one or more base stations of the wireless access layer;
determining, in at least one of the core network layer and the edge computing layer of the mobile network, based on the plurality of historical routes and the plurality of current positions of the plurality of users in the geographic area, a set of predicted locations among the plurality of locations that the plurality of users will visit in the future, respectively, wherein the set of predicted locations is updated over time based on changes in the current positions of the users as collected from their respective mobile terminals;
selecting, in at least one of the core network layer and the edge computing layer of the mobile network, a set of popular locations from the set of predicted locations based on a number of users among the plurality of users who will visit each predicted location in the set of predicted locations; and
scheduling, in at least one of the core network layer and the edge computing layer of the mobile network, tour guiding resources associated with the set of popular locations, wherein the tour guiding resources associated with the set of popular locations are stored at one or more of the core network layer and the edge computing layer in the mobile network;
wherein the determining and selecting further comprise:
generating a predicted next location for each of the plurality of users, utilizing one or more conditional probabilities determined based on one or more previous locations; aggregating the predicted next locations across the plurality of users;
ranking the aggregated predicted next locations; and
selecting one or more portions of the tour guiding resources associated with the set of popular locations based on the aggregated predicted next locations;
wherein the scheduling further comprises:
sending, in response to determining in a resource scheduler of the edge computing layer that at least one of the one or more selected portions of the tour guiding resources associated with the set of popular locations has not already been pre-loaded into the edge computing layer, a request from the resource scheduler of the edge computing layer to a core network manager of the core network layer for obtaining the at least one of the one or more selected portions of the tour guiding resources associated with the set of popular locations; and
pre-loading the at least one of the one or more selected portions of the tour guiding resources, obtained by the resource scheduler of the edge computing layer from the core network manager of the core network layer in response to the request from the resource scheduler of the edge computing layer, into one or more particular ones of the edge devices of the edge computing based on the ranking of the aggregated predicted next locations; and
repeating the sending and pre-loading based on the updating of the set of predicted locations; and
wherein the actions further comprise:
providing, in response to a fetch request from a given one of the mobile terminals of a given one of the users, a portion of the tour guiding resources associated with a current position of the given user from the one or more particular edge devices of the edge computing layer to the given mobile terminal.

10. The electronic device according to claim 9, wherein determining the set of predicted locations comprises:
determining, based on the plurality of historical routes, a conditional probability that the plurality of historical users visit at least one other location prior to visiting a given location in the plurality of locations; and
determining, based on the conditional probability, the set of predicted locations that the plurality of users will visit in the future.

11. The electronic device according to claim 10, wherein determining the conditional probability comprises:
determining a first number of users of historical users among the plurality of historical users who visited the given location;
determining, for other locations in the plurality of locations different from the given location, a second number of users among the plurality of historical users who visited the other locations prior to visiting the given location; and
determining a conditional probability for the other locations based on the first number of users and the second number of users.

12. The electronic device according to claim 10, wherein determining the set of predicted locations based on the conditional probability comprises: for a given user among the plurality of users,
determining, based on the conditional probability, a predicted location that the given user will visit in the future; and
generating the set of predicted locations based on the predicted location.

13. The electronic device according to claim 12, wherein determining the predicted location that the given user will visit in the future comprises:

determining, based on the conditional probability, a visiting probability that the given user will visit each of multiple other locations in the plurality of locations in the future; and determining, based on a comparison of the visiting probabilities, the predicted location that the given user will visit in the future.

14. The electronic device according to claim 13, wherein determining the predicted location based on a comparison of the visiting probabilities comprises:

identifying, among visiting probabilities associated with the other locations, a location associated with a maximum probability as the predicted location.

15. The electronic device according to claim 9, wherein selecting the set of popular locations from the set of predicted locations comprises:

ranking the set of predicted locations by the number of users who will visit each predicted location in the set of predicted locations; and selecting the set of popular locations from the set of predicted locations that have been ranked.

16. The electronic device according to claim 9, wherein the tour guiding resources include data of at least any of the following services associated with the set of popular locations: a streaming media service, a virtual reality service, an augmented reality service, and a mixed reality service.

17. A computer program product that is tangibly stored on a non-transitory computer-readable medium and comprises machine-executable instructions, wherein the machine-executable instructions when executed by at least one device cause the at least one device to perform a method for scheduling tour guiding resources in a mobile network, the mobile network comprising a core network layer, an edge computing layer, and a wireless access layer, the edge computing layer comprising a plurality of edge devices disposed between the core network layer and the wireless access layer, the wireless access layer comprising a plurality of mobile terminals and one or more base stations configured for wireless communication with the mobile terminals, the method comprising:

acquiring, in at least one of the core network layer and the edge computing layer of the mobile network, a plurality of historical routes of movement of a plurality of historical users in a geographic area, wherein a historical route in the plurality of historical routes comprises at least a portion of a plurality of locations in the geographic area;

tracking a plurality of current positions of a plurality of users in the geographic area by processing, in at least the wireless access layer, signals associated with respective mobile terminals of the plurality of users, wherein the tracking comprises repeatedly collecting the current positions of the users from their respective mobile terminals over time via the one or more base stations of the wireless access layer;

determining, in at least one of the core network layer and the edge computing layer of the mobile network, based on the plurality of historical routes and the plurality of current positions of the plurality of users in the geographic area, a set of predicted locations among the plurality of locations that the plurality of users will visit in the future, respectively, wherein the set of predicted locations is updated over time based on changes in the current positions of the users as collected from their respective mobile terminals;

selecting, in at least one of the core network layer and the edge computing layer of the mobile network, a set of popular locations from the set of predicted locations based on a number of users among the plurality of users who will visit each predicted location in the set of predicted locations; and scheduling, in at least one of the core network layer and the edge computing layer of the mobile network, tour guiding resources associated with the set of popular locations, wherein the tour guiding resources associated with the set of popular locations are stored at one or more of the core network layer and the edge computing layer in the mobile network;

wherein the determining and selecting further comprise:

generating a predicted next location for each of the plurality of users, utilizing one or more conditional probabilities determined based on one or more previous locations;

aggregating the predicted next locations across the plurality of users; ranking the aggregated predicted next locations; and selecting one or more portions of the tour guiding resources associated with the set of popular locations based on the aggregated predicted next locations;

wherein the scheduling further comprises:

sending, in response to determining in a resource scheduler of the edge computing layer that at least one of the one or more selected portions of the tour guiding resources associated with the set of popular locations has not already been pre-loaded into the edge computing layer, a request from the resource scheduler of the edge computing layer to a core network manager of the core network layer for obtaining the at least one of the one or more selected portions of the tour guiding resources associated with the set of popular locations;

pre-loading the at least one of the one or more selected portions of the tour guiding resources, obtained by the resource scheduler of the edge computing layer from the core network manager of the core network layer in response to the request from the resource scheduler of the edge computing layer, into one or more particular ones of the edge devices of the edge computing layer based on the ranking of the aggregated predicted next locations; and repeating the sending and pre-loading based on the updating of the set of predicted locations; and wherein the method further comprises:

providing, in response to a fetch request from a given one of the mobile terminals of a given one of the users, a portion of the tour guiding resources associated with a current position of the given user from the one or more particular edge devices of the edge computing layer to the given mobile terminal.

18. The computer program product of claim 17, wherein determining the set of predicted locations comprises:

determining, based on the plurality of historical routes, a conditional probability that the plurality of historical users visit at least one other location prior to visiting a given location in the plurality of locations; and determining, based on the conditional probability, the set of predicted locations that the plurality of users will visit in the future.

19. The computer program product of claim 18, wherein determining the conditional probability comprises:

determining a first number of users of historical users among the plurality of historical users who visited the given location;

determining, for other locations in the plurality of locations different from the given location, a second number of users among the plurality of historical users who visited the other locations prior to visiting the given location; and determining a conditional probability for the other locations based on the first number of users and the second number of users.

20. The computer program product of claim 18, wherein determining the set of predicted locations based on the conditional probability comprises: for a given user among the plurality of users, determining, based on the conditional probability, a predicted location that the given user will visit in the future; and generating the set of predicted locations based on the predicted location.

\* \* \* \* \*